United States Patent
Woerner et al.

(10) Patent No.: US 10,902,085 B2
(45) Date of Patent: Jan. 26, 2021

(54) SOLVING MIXED INTEGER OPTIMIZATION PROBLEMS ON A HYBRID CLASSICAL-QUANTUM COMPUTING SYSTEM

(71) Applicant: International Business Machines Corporation, Armonk, NY (US)

(72) Inventors: Stefan Woerner, Rueschlikon (CH); Giacomo Nannicini, New York, NY (US); Panagiotis Barkoutsos, Zurich (CH); Ivano Tavernelli, Zurich (CH)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 93 days.

(21) Appl. No.: 16/248,278

(22) Filed: Jan. 15, 2019

(65) Prior Publication Data
US 2020/0226197 A1 Jul. 16, 2020

(51) Int. Cl.
*G06F 17/12* (2006.01)
*G06N 10/00* (2019.01)

(52) U.S. Cl.
CPC ............ *G06F 17/12* (2013.01); *G06N 10/00* (2019.01)

(58) Field of Classification Search
CPC .......... G06F 17/11; G06F 17/12; G06N 10/00
See application file for complete search history.

(56) References Cited

U.S. PATENT DOCUMENTS

| | | |
|---|---|---|
| 2014/0344198 A1 | 11/2014 | Taits et al. |
| 2015/0205759 A1 | 7/2015 | Isreal et al. |
| 2015/0363358 A1 | 12/2015 | Ronagh |
| 2016/0224515 A1* | 8/2016 | Ronagh ................. G06N 5/003 |
| 2016/0338075 A1 | 11/2016 | McKibben |
| 2016/0370772 A1 | 12/2016 | Tanartkit et al. |
| 2017/0344898 A1* | 11/2017 | Karimi .................... G06F 15/78 |

FOREIGN PATENT DOCUMENTS

WO 2015016836 A1 2/2015

OTHER PUBLICATIONS

Tran et al., "A Hybrid Quantum-Classical Approach to Solving Scheduling Problems", Copyright 2016, Association for the Advancement of Artificial Intelligence (www.aaai.org). https://pdfs.semanticscholar.org., https://pdfs.semanticscholar.org/3f95/c32231fe998bfc3de2be83984274c185e65c.pdf.

* cited by examiner

*Primary Examiner* — Chuong D Ngo
(74) *Attorney, Agent, or Firm* — Garg Law Firm, PLLC; Rakesh Garg; Keivan Razavi (57) ABSTRACT

Solving mixed integer problems using a hybrid classical-quantum computing system includes generating a plurality of decision variables for a function associated with a combinatorial optimization problem by a first processor using an optimizer, and deriving at least one quantum state parameter for a quantum processor based upon one or more of the decision variables. The quantum processor is initiated in a quantum state based upon the at least one quantum state parameter. A plurality of intermediate quantum states of the quantum processor are measured using a plurality of quantum measurements of the quantum state to obtain a plurality of samples. The plurality of samples are evaluated by the first processor to obtain a measure of a quality of the quantum state and of one or more solutions to the combinatorial optimization problem.

20 Claims, 6 Drawing Sheets

SOLVING MIXED INTEGER OPTIMIZATION PROBLEMS ON A HYBRID CLASSICAL-QUANTUM COMPUTING SYSTEM

TECHNICAL FIELD

The present invention relates generally to solving optimization problems using quantum computing. More particularly, the present invention relates to a system and method for solving mixed integer optimization problems on a hybrid classical-quantum computing system.

BACKGROUND

Hereinafter, a "Q" prefix in a word of phrase is indicative of a reference of that word or phrase in a quantum computing context unless expressly distinguished where used.

Molecules and subatomic particles follow the laws of quantum mechanics, a branch of physics that explores how the physical world works at the most fundamental levels. At this level, particles behave in strange ways, taking on more than one state at the same time, and interacting with other particles that are very far away. Quantum computing harnesses these quantum phenomena to process information.

The computers we use today are known as classical computers (also referred to herein as "conventional" computers or conventional nodes, or "CN"). A conventional computer uses a conventional processor fabricated using semiconductor materials and technology, a semiconductor memory, and a magnetic or solid-state storage device, in what is known as a Von Neumann architecture. Particularly, the processors in conventional computers are binary processors, i.e., operating on binary data represented in 1 and 0.

A quantum processor (q-processor) uses the odd nature of entangled qubit devices (compactly referred to herein as "qubit," plural "qubits") to perform computational tasks. In the particular realms where quantum mechanics operates, particles of matter can exist in multiple states—such as an "on" state, an "off" state, and both "on" and "off" states simultaneously. Where binary computing using semiconductor processors is limited to using just the on and off states (equivalent to 1 and 0 in binary code), a quantum processor harnesses these quantum states of matter to output signals that are usable in data computing.

Conventional computers encode information in bits. Each bit can take the value of 1 or 0. These 1s and 0s act as on/off switches that ultimately drive computer functions. Quantum computers, on the other hand, are based on qubits, which operate according to two key principles of quantum physics: superposition and entanglement. Superposition means that each qubit can represent both a 1 and a 0 at the same time. Entanglement means that qubits in a superposition can be correlated with each other in a non-classical way; that is, the state of one (whether it is a 1 or a 0 or both) can depend on the state of another, and that there is more information that can be ascertained about the two qubits when they are entangled than when they are treated individually.

Using these two principles, qubits operate as more sophisticated processors of information, enabling quantum computers to function in ways that allow them to solve difficult problems that are intractable using conventional computers. IBM has successfully constructed and demonstrated the operability of a quantum processor using superconducting qubits (IBM is a registered trademark of International Business Machines corporation in the United States and in other countries.)

The illustrative embodiments recognize that quantum processors can be used to solve combinatorial optimization problems. Combinatorial optimization problems are concerned with finding optimal objects from a finite set of objects that satisfy given conditions. Combinatorial optimization involves determining a minima or maxima of an objective function. For example, the travelling salesman problem involves determining the shortest possible path between n cities that visits each city exactly once. Combinatorial optimization involves determining the solution (paths between the cities) with the least cost. The solution space of a combinatorial optimization problem is the set of possible solutions.

The illustrative embodiments recognize that some current methods of solve combinatorial optimization problems use hybrid quantum/classical optimization algorithms in which a classical processor runs a classical optimization scheme to generate parameters for an combinatorial optimization problem. A quantum state for a quantum processor is prepared depending on the particular problem to be solved and the given parameters. The quantum processor executes the prepared quantum state and measures the quantum state a number of times to sample from the solution space. The classical processor receives the samples from the quantum processor and evaluates the received samples to determine if the parameters for the classical optimization scheme are to be updated.

The illustrative embodiments recognize that currently known methods to solve combinatorial optimization problems allow only for binary variables such as Ising type statistical mechanics, quantum approximate optimization algorithm (QAOA), variational-quantum-eigensolver (VQE), and quantum annealing methods. The binary variable constrain is very limited in applicability as it does not allow including, for example, inequality constraints or mixed integer optimization problems, i.e., optimization problems with both continuous and discrete decision variables.

The illustrative embodiments recognize that classical algorithms exist to solve mixed integer optimization problems. However, since the number of combinations scales exponentially with the number of variables, classical algorithms quickly reach their limit of the problems that can be handled by them. The illustrative embodiments recognize that the solution space of combinatorial optimization problems is typically too large to exhaustively search using conventional computers. For many combinatorial optimization problems, computing a sufficiently large sample of the entire solution space is cost prohibitive or not currently possible using conventional computing but may be possible using quantum computing architectures. The illustrative embodiments recognize that a need exists for a novel method to solve mixed integer optimization problems using a quantum computing system.

SUMMARY

The illustrative embodiments provide a method, system, and computer program product for solving mixed integer optimization problems on a hybrid classical-quantum computing system. An embodiment of a method for solving mixed integer problems using a hybrid classical-quantum computing system includes generating a plurality of decision variables for a function associated with a combinatorial optimization problem by a first processor using an optimizer. The embodiment further includes deriving at least one quantum state parameter for a quantum processor based upon one or more of the decision variables. The embodiment further includes initiating the quantum processor in a quantum state based upon the at least one quantum state parameter. The embodiment further includes measuring a plurality of intermediate quantum states of the quantum processor using a plurality of quantum measurements of the quantum state to obtain a plurality of samples. The embodiment further includes evaluating, by the first processor, the plurality of samples to obtain a measure of a quality of the quantum state and of one or more solutions to the combinatorial optimization problem. Thus, the embodiment provides for a manner of solving mixed integer optimization problems using a quantum computing system.

In another embodiment, the first processor comprises a classical processor. Thus, the embodiment provides for calculation of certain decision variables of a mixed integer problem using a conventional classical processor.

In another embodiment, the plurality of decision variables includes at least one discrete decision variable and at least one continuous decision variable. Thus, the embodiment provides for solving mixed integer optimization problems having both discrete and continuous decision variables. In another embodiment, the at least one quantum state parameter is derived based upon the at least one discrete decision variable. Thus, the embodiment provides for representation of a discrete decision variable by quantum state parameters to allow calculation of the discrete decision variable by a quantum computing system.

Another embodiment further includes deriving, by the first processor, at least one classical parameter from the at least one continuous decision variable. In another embodiment, the evaluating further includes evaluating the at least one classical parameter by the first processor to obtain the one or more solutions. Thus, the embodiments provide for calculation of continuous decision variables using a classical processor and calculation of discrete decision variables using a quantum processor.

Another embodiment further includes evaluating the function for each of the plurality of samples and each of the at least one classical sample to obtain a plurality of function values, and aggregating the plurality of function values using an aggregation function to obtain an aggregated function value result. Thus, the embodiment provides for determining an aggregate value for a plurality of quantum state measurements to determine a more accurate measurement of the quantum state.

Another embodiment further includes providing the aggregated function value result to the optimizer. Another embodiment further includes generating, by the optimizer, a plurality of updated decision variables for the function based upon the aggregated function value result. Thus, the embodiments provide for a more accurate solution by iteratively performing the quantum and classical calculations until a desired accuracy is reached.

In another embodiment, the at least one quantum state parameter includes a quantum angle. Thus, an embodiment allows for representation of a discrete decision variable in a manner that allows calculation of the discrete decision variable by a quantum computing system.

In an embodiment, the method is embodied in a computer program product comprising one or more computer-readable storage devices and computer-readable program instructions which are stored on the one or more computer-readable tangible storage devices and executed by one or more processors.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

The illustrative embodiments used to describe the invention generally address and solve the above-described problem of solving optimization problems using quantum computing. The illustrative embodiments provide a method for solving mixed integer optimization problems on a hybrid classical-quantum computing system.

An embodiment provides a method for enhancing quantum-classical algorithms for combinatorial optimization. Another embodiment provides a conventional or quantum computer usable program product comprising a computer-readable storage device, and program instructions stored on the storage device, the stored program instructions comprising a method for enhancing quantum-classical algorithms for combinatorial optimization. The instructions are executable using a conventional or quantum processor. Another embodiment provides a computer system comprising a conventional or quantum processor, a computer-readable memory, and a computer-readable storage device, and program instructions stored on the storage device for execution by the processor via the memory, the stored program instructions comprising a method for enhancing quantum-classical algorithms for combinatorial optimization.

In an example classical optimization problem, an objective function f(z) depends upon a binary decision variable z which can be equal to either −1 or +1. An algorithm seeks to minimize the objective function as follows:

$$\min_{z \in \{-1,+1\}^n} f(z)$$

where $$f(z) = \sum_{i=1}^{n} g_i * Z_i + \sum_{i,j=1}^{n} h_{i,j} * z_i * z_j$$

and $g_i$ is a weighting variable, $z_i$ is an $i^{th}$ component of a decision variable z, $h_{ij}$ is weighting variable, and $z_i$ and $z_j$ are decision variables.

The illustrative embodiments recognize that hybrid classical-quantum computing systems such as VQE or QAOA use parameterized quantum circuits, sample from the resulting quantum states, and optimize over the classical parameters to generate an improving sequence of samples to provide a heuristic to address difficult classes of optimization problems.

The illustrative embodiments recognize that current hybrid algorithms aim to minimize a classical objective function in which parts of the objective function are evaluated on a quantum computer with respect to continuous rotation angles θ that parameterize a quantum state $|\psi(\theta)\rangle$ of the quantum circuit generating the quantum state. Sampling from the resultant quantum state is sued to approximate the expected values that can lead to acceptable solutions to the original classical optimization problem.

The illustrative embodiments recognize that existing hybrid algorithms can only handle linear quality constraints of the form a*z+b=0 by adding a penalty term to the objective which should be set to zero: $(a*z+b)^2$. For many applications inequality constrains are required of the form a*z+b≤0. The illustrative embodiments recognize that often a mix between discrete (e.g., binary) and continuous variables is required, but that current algorithms support only binary variables.

The embodiments recognize that instead of only parameterizing the quantum circuit, various embodiments described herein also parameterize the actual optimization problem and runs a hybrid algorithm that optimizes over both classical and quantum portions of the algorithm to allow solving of mixed integer optimization problems.

Various embodiments described herein consider a more general classical optimization problem having an objective function of the form:

$$f(z,\omega) = \sum_{i=1}^{n} g_i(z_i,\omega) + \sum_{i,j=1}^{n} h_{ij}(z_i,z_j,\omega)$$

in which z is a discrete decision variable and w is a continuous decision variable.

For instance, the general classical optimization problem allows the adding of slack variables to equality constraints (ω≥0): α*z+b+ω=0 which realizes the inequality constraint a*z+b≤0.

The inequality constraint ω≥0 can be handled in the classical optimization, since ω is a continuous parameter.

Various embodiment describe herein may be used to extend a VQE hybrid classical-quantum approach as well as a QAOA approach provided that the functions $g_i$ are linear in $z_i$ and $h_{ij}$, are bilinear in $(z_i, z_j)$.

For the clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for enhancing quantum-classical algorithms for combinatorial optimization using a variety of components that can be purposed or repurposed to provide a described function within a data processing environment, and such adaptations are contemplated within the scope of the illustrative embodiments.

The illustrative embodiments are described with respect to certain types of steps, applications, classical processors, quantum processors, quantum states, combinatorial optimization problems, and data processing environments only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
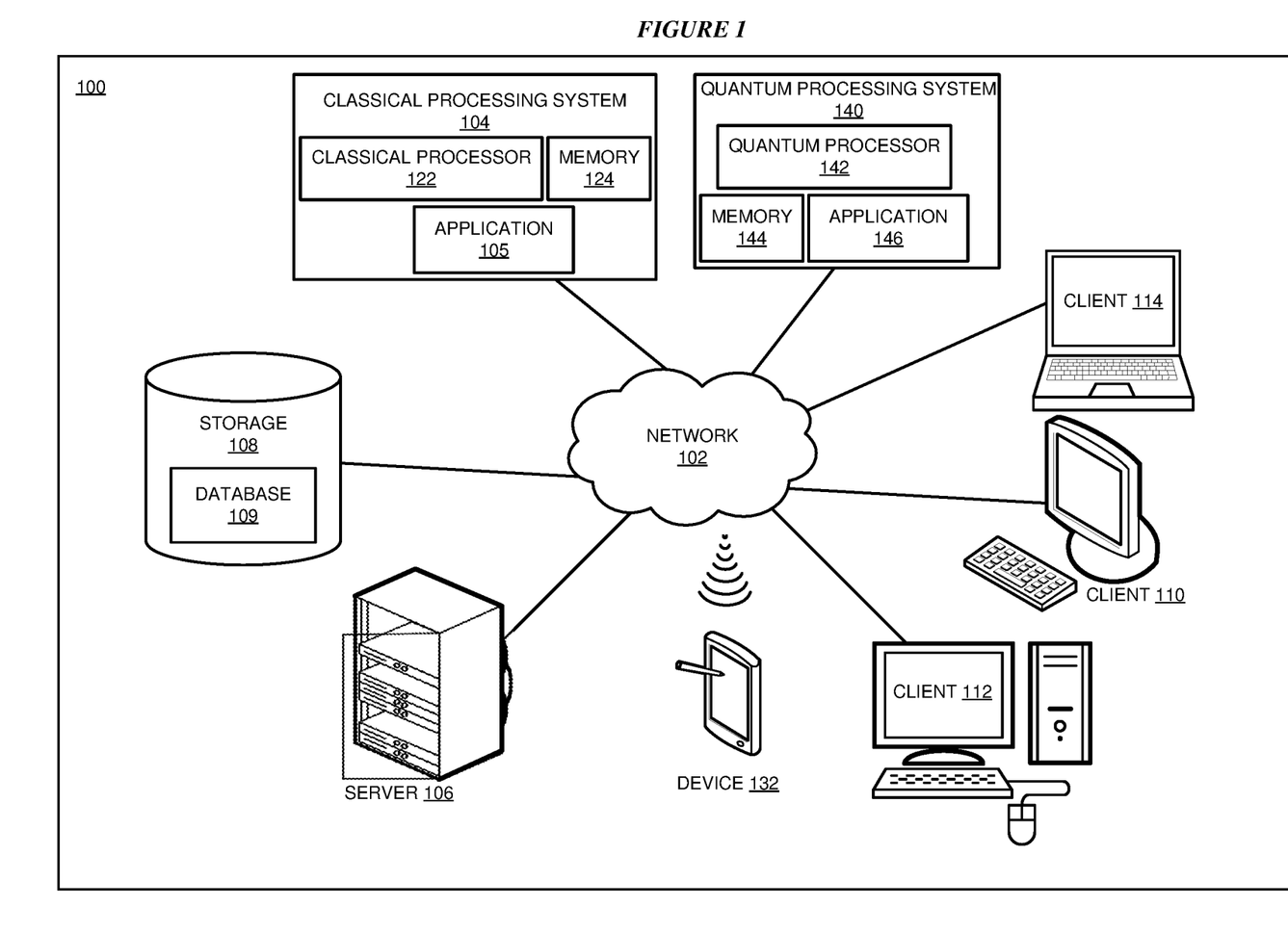
FIG. 1 depicts a block diagram of a network of data processing systems in which illustrative embodiments may be implemented.
Figure 2:
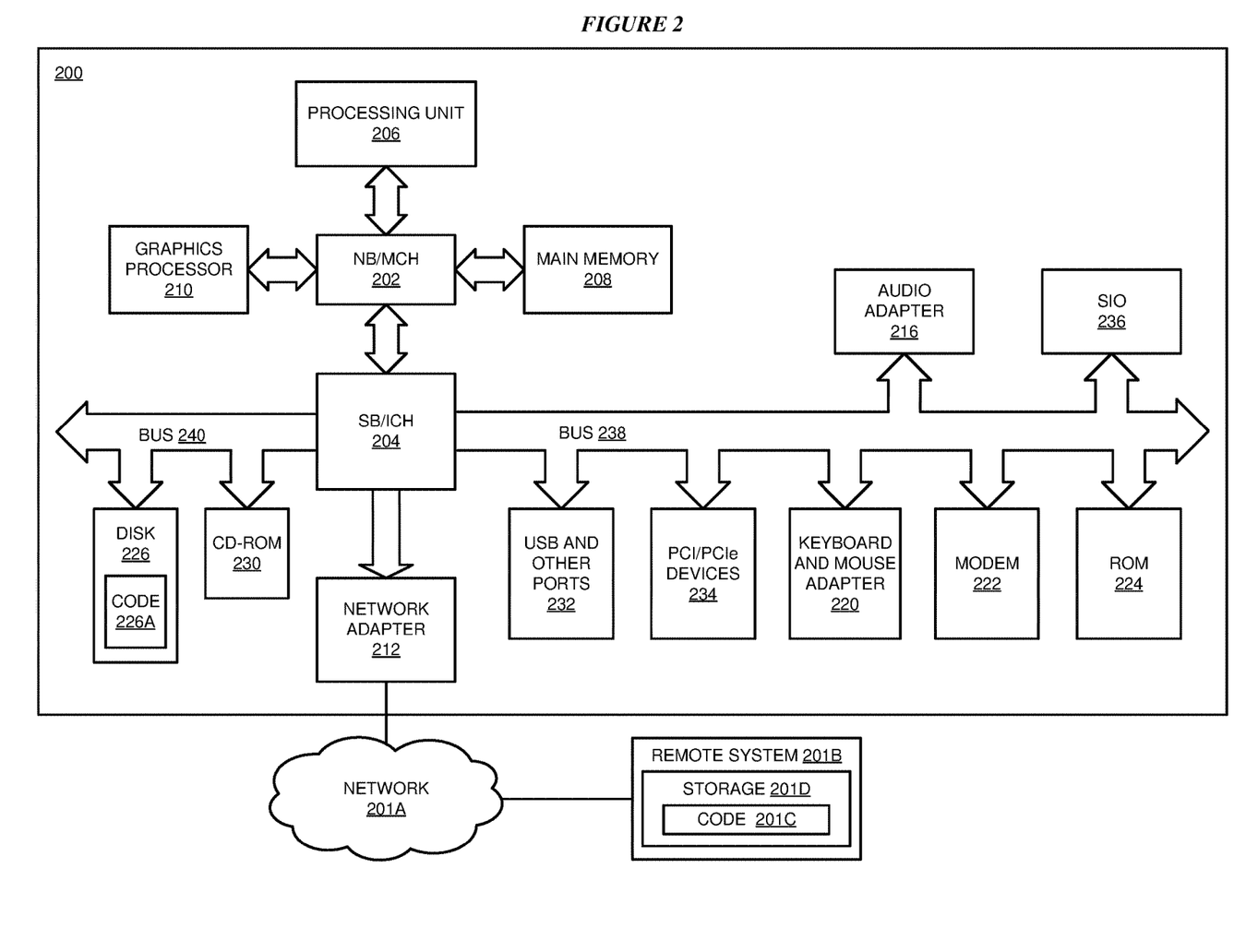
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Classical processing system 104 couples to network 102. Classical processing system 104 is a classical processing system. Software applications may execute on any quantum data processing system in data processing environment 100. Any software application described as executing in classical processing system 104 in FIG. 1 can be configured to execute in another data processing system in a similar manner. Any data or information stored or produced in classical processing system 104 in FIG. 1 can be configured to be stored or produced in another data processing system in a similar manner. A classical data processing system, such as classical processing system 104, may contain data and may have software applications or software tools executing classical computing processes thereon.

Server 106 couples to network 102 along with storage unit 108. Server 106 is a conventional data processing system. Quantum processing system 140 couples to network 102. Quantum processing system 140 is a quantum data processing system. Software applications may execute on any quantum data processing system in data processing environment 100. Any software application described as executing in quantum processing system 140 in FIG. 1 can be configured to execute in another quantum data processing system in a similar manner. Any data or information stored or produced in quantum processing system 140 in FIG. 1 can be configured to be stored or produced in another quantum data processing system in a similar manner. A quantum data processing system, such as quantum processing system 140, may contain data and may have software applications or software tools executing quantum computing processes thereon.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several conventional data processing systems, quantum data processing systems, and a data network as shown, whereas another embodiment can be implemented on a single conventional data processing system or single quantum data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, classical processing system 104, quantum processing system 140, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to classical processor 122. Classical processor 122 may include its own data, boot files, operating system images, and applications. Data processing environment 100 may include additional memories, quantum processors, and other devices that are not shown. Memory 124 includes application 105 that may be configured to implement one or more of the classical processor functions described herein for solving mixed integer optimization problems on a hybrid classical-quantum computing system in accordance with one or more embodiments.

In the depicted example, memory 144 may provide data, such as boot files, operating system images, and applications to quantum processor 142. Quantum processor 142 may include its own data, boot files, operating system images, and applications. Data processing environment 100 may include additional memories, quantum processors, and other devices that are not shown. Memory 144 includes application 146 that may be configured to implement one or more of the quantum processor functions described herein for solving mixed integer optimization problems on a hybrid classical-quantum computing system in accordance with one or more embodiments.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as classical processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D, in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
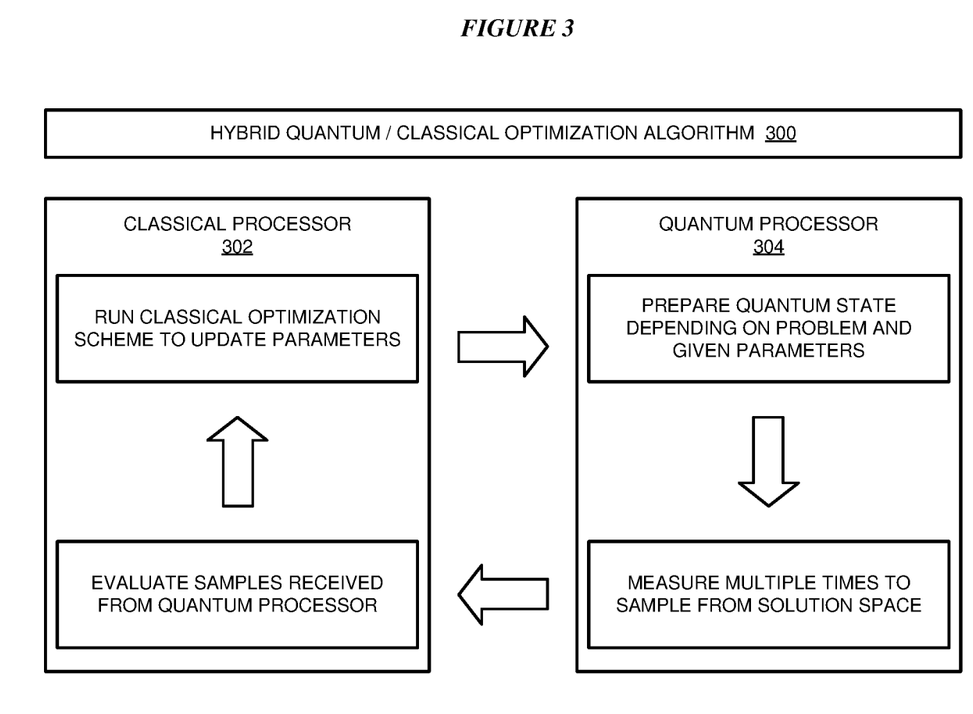
FIG. 3 depicts a block diagram of an example hybrid quantum/classical optimization algorithm for solving combinatorial optimization problems using a classical processor and a quantum processor.

With reference to FIG. 3, this figure depicts a block diagram of an example hybrid quantum/classical optimization algorithm 300 for solving combinatorial optimization problems using a classical processor 302 and a quantum processor 304. In the example, classical processor 302 runs a classical optimization scheme to generate update parameters for an combinatorial optimization problem and sends the update parameters to quantum processor 304. Quantum processor 304 prepares a quantum state for depending on the particular combinatorial problem to be solved and the given update parameters. Quantum processor 304 executes the prepared quantum state and measures the quantum state a multiple number of times to sample from the solution space to generate samples. Classical processor 302 receives the samples from quantum processor 304 and evaluates the received samples to determine if the parameters for the classical optimization scheme are to be updated.

If classical processor 302 determines that the parameters for the combinatorial optimization problem are to be updated, classical processor 302 runs the classical optimization scheme using the updated parameters to generated further updated parameters. Classical processor 302 then sends the further updated parameters to quantum processor 304. Typically, the process is repeated until convergence within an acceptable threshold is obtained.

Figure 4:
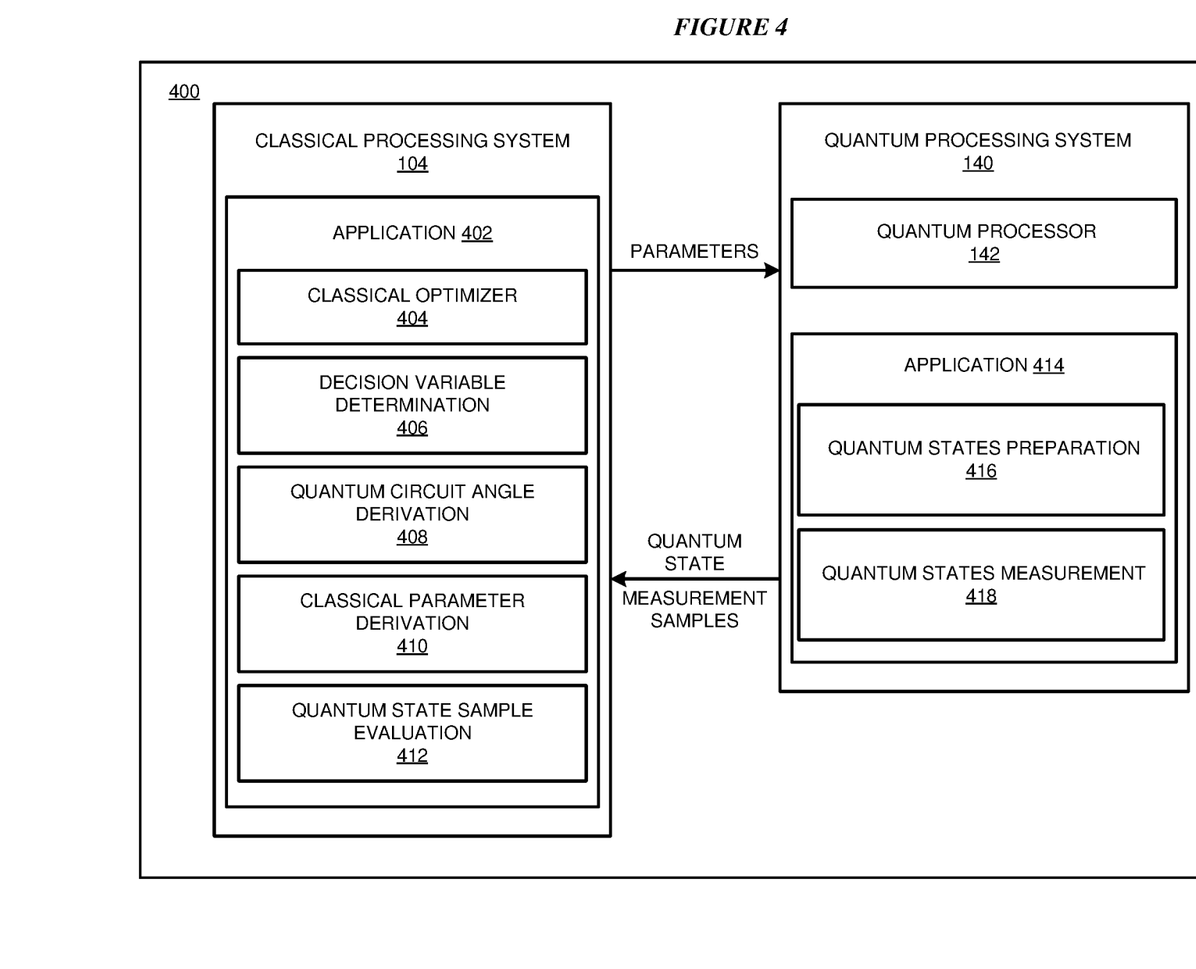
FIG. 4 depicts a block diagram of an example configuration for solving mixed integer optimization problems on a hybrid classical-quantum computing system in accordance with an illustrative embodiment.

With reference to FIG. 4, this figure depicts a block diagram of an example configuration 400 for solving mixed integer optimization problems on a hybrid classical-quantum computing system in accordance with an illustrative embodiment. The example embodiment includes classical processing system 104 and quantum processing system 140. Classical processing system 104 includes an application 402. In a particular embodiment, application 402 is an example of application 105 of FIG. 1. Application 402 includes a classical optimizer component 404, a decision variable determination component 406, a quantum circuit angle derivation component 408, a classical parameter derivation component 410, and a quantum state sample evaluation component 412.

Quantum processing system 140 includes a quantum processor 142 and an application 414. In a particular embodiment, application 414 is an example of application 146 of FIG. 1. Application 414 includes a quantum states preparation component 416 and a quantum states measurement component 418.

In the embodiment, classical optimizer component 404 is configured to execute a classical optimization scheme and utilize optimization parameter determination component 406 to generate decision variables of a classical objective function associated with a combinatorial optimization problem. In a particular embodiment, the decision variables include at least one discrete decision variable (e.g., a binary decision variable) and at least one continuous decision variable. Quantum circuit angle derivation component 408 is configured to derive quantum angles for a quantum circuit within quantum processor 142 of quantum processing system 140 from one or more of the decision variables. In a particular embodiment, quantum circuit angle derivation component 408 derives the quantum angles for the quantum circuit based upon the at least one discrete decision variable.

Classical parameter derivation component 410 is configured to derive classical parameters from one or more of the determined decision variables. In a particular embodiment, classical parameter derivation component 410 is configured to derive the classical parameters based upon the at least one continuous decision variable. Application 402 is further configured to provide the angle parameters to quantum processing system 140.

Quantum states preparation component 416 is configured to prepare one or more quantum states for the quantum circuit of quantum processor 142 based upon the quantum angles as a solution space of the problem. Quantum processor 142 then executes using the prepared quantum states as initial states of a qubit. Quantum states measurement component 418 is configured to measure intermediate quantum states a multiple of times to generate samples representative of the intermediate quantum states. In one or more embodiments, a fixed set of quantum state parameters are used to prepare the same quantum state, but measurements of the quantum state leads to probabilistic results resulting from the plurality of samples. In particular embodiments, the samples include discrete values (e.g., −1 or +1). Application 414 is further configured to send the quantum state measurement samples to application 402 of classical processing system 104.

In the embodiment, quantum state sample evaluation component 412 evaluates the quantum state measurement samples using a classical aggregation function to determine an aggregate quantum state measurement value from the samples. An aggregation function determines multiple values from a single value. In a particular embodiment, the classical aggregation function averages the quantum state measurement samples to determine a single aggregate value. In one or more embodiments, the quantum state sample evaluation component 412 evaluates the plurality of samples to obtain a measure of the quality of the quantum state and of the solutions to the mixed-integer optimization problem that can be sampled from such a quantum state. In the embodiment, quantum state sample evaluation function returns the aggregate value to classical optimizer 404. In an embodiment, application 402 determines updated decision variables based upon the aggregate value, generates updated quantum state parameters from the updated decision variables, provides the new quantum state parameters to quantum processing system 140 and the process continues iteratively until a solution is reached within a predetermine acceptable level such as after convergence.

Figure 5:
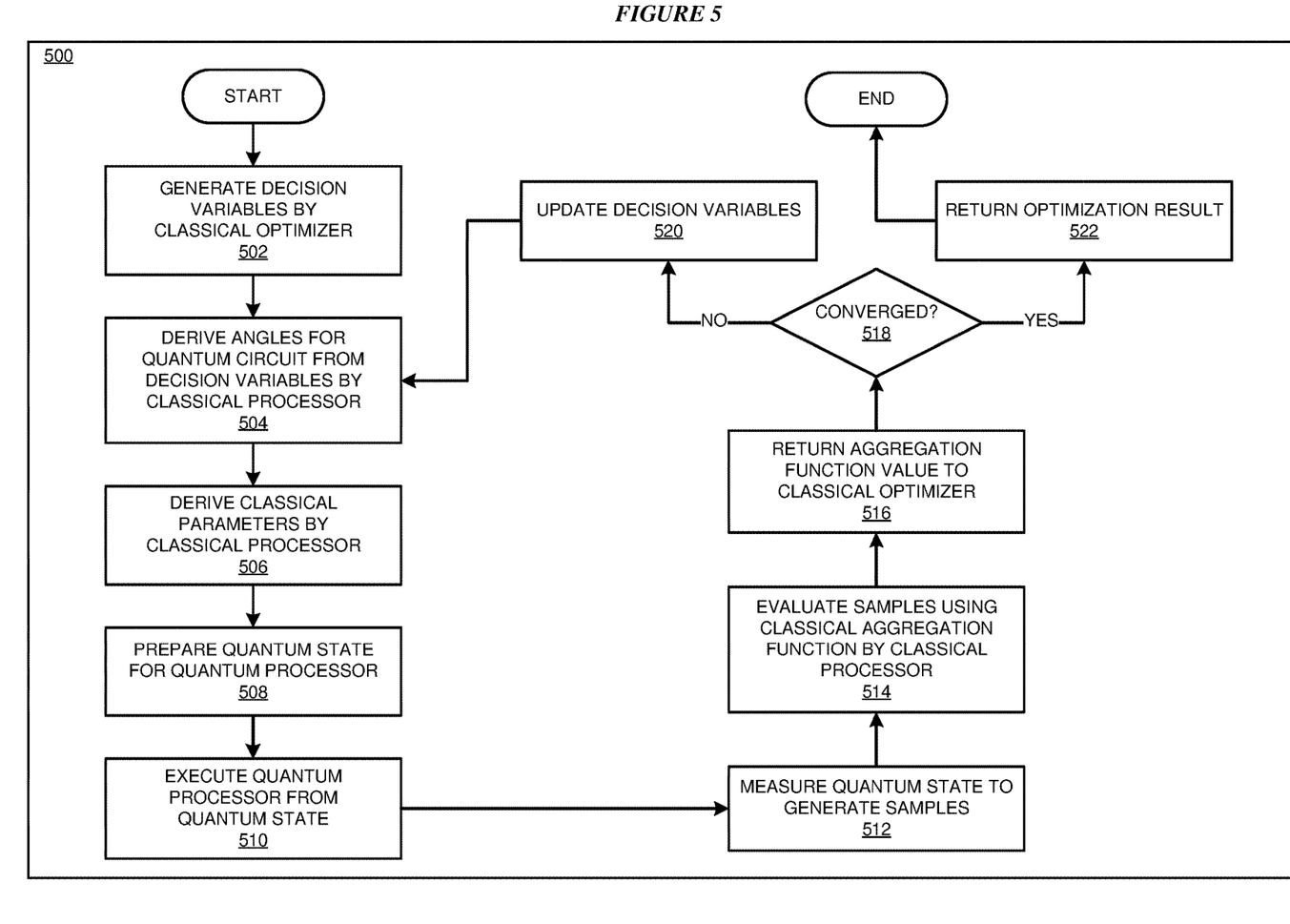
FIG. 5 depicts a flowchart of an example process for solving mixed integer optimization problems on a hybrid classical-quantum computing system in accordance with an illustrative embodiment.

With reference to FIG. 5, this figure depicts a flowchart of an example process 500 for solving mixed integer optimization problems on a hybrid classical-quantum computing system in accordance with an illustrative embodiment. In block 502, classical processor 122 uses a classical optimizer to generate decision variables of a classical objective function associated with a combinatorial optimization problem using a classical optimization scheme. In a particular embodiment, classical processor 122 generates decision variables $Y_k$ for k iterations of the objective function. In a particular embodiment, the decision variables include discrete decision variables (e.g., binary or integer decision variables) and continuous decision variables.

In block 504, classical processor 122 derives quantum angles θ and/or other quantum state parameters for a quantum circuit within quantum processor 142 from one or more of the parameters. In a particular embodiment, classical processor 122 derives the quantum angles θ and/or other quantum state parameters for the quantum circuit based upon the discrete decision variables.

In block 506, classical processor 122 derives classical parameters ω from one or more of the determined decision variables. In a particular embodiment, classical processor 122 derives the classical parameters ω based upon the continuous decision variables. In one or more embodiments, classical processor 122 sends the quantum angles ω and/or other quantum parameters to quantum processor 142.

In block 508, quantum processor 142 prepares a quantum state $|\psi(\theta)\rangle$ for the quantum circuit of quantum processor 142 based upon the quantum angles and/or other quantum state parameters as a solution space of the problem. In block 510, quantum processor 142 executes the prepared quantum states as an initial quantum state of a qubit. In block 512, quantum processor 142 measures the quantum state of the quantum circuit an N number of times to generate a plurality of quantum state measurement samples representative of the quantum state. In particular embodiments, the samples include discrete values $z_k^1 \in \{-1, +1\}^n$, i=1 ... , N. In one or more embodiments, quantum processor 142 sends the samples to classical processor 122.

In block 514, classical processor 122 evaluates the objective function $f(z_k^1, \omega_k)$ using the quantum state measurement samples $z_k^i$ and classical parameters $\omega_k$ and aggregates the values using a classical aggregation function to determine an aggregate quantum state measurement value from the samples and classical parameters. In a particular embodiment, the classical aggregation function averages the objective function values to determine a single aggregate objective function value. In another particular embodiment, the classical aggregation function utilizes a conditional value-at-risk (CVaR) algorithm to determine the aggregate objective function value.

In block 516, classical processor 122 returns the aggregate objective function value to the classical optimizer. In block 518, classical processor 122 determines whether the objective function has converged. If the objective function has not converged, in block 520 classical processor 122 determines updated decision variables based upon the aggregate value and process 500 returns to block 504. If the objective function has converged, in block 522 classical processor 122 returns an optimization result as a solution to the combinatorial optimization problem. Process 500 then ends.

Figure 6:
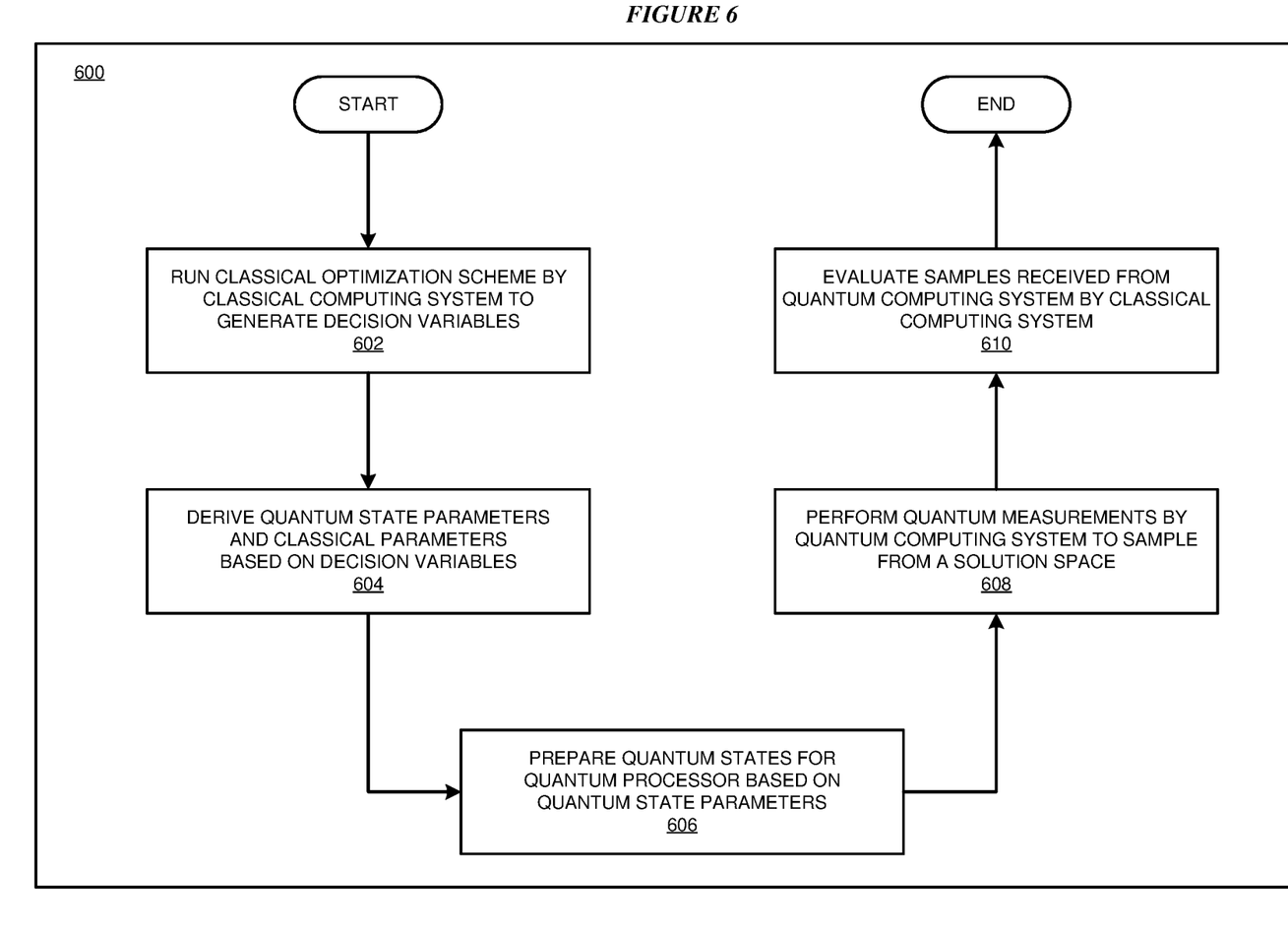
FIG. 6 depicts a flowchart of another example process for solving mixed integer optimization problems on a hybrid classical-quantum computing system in accordance with an illustrative embodiment.

With reference to FIG. 6, this figure depicts a flowchart of another example process 600 for solving mixed integer optimization problems on a hybrid classical-quantum computing system in accordance with an illustrative embodiment. In block 602, a classical optimization scheme is run by a classical computing system, such as classical processing system 104 of FIG. 1, to generate decision variables for a combinatorial optimization problem. In a particular embodiment, the decision variables include at least one discrete decision variable (e.g., a binary or integer decision variable) and continuous decision variables. In block 604, the classical computing system derives quantum angles θ and/or other quantum state parameters for a quantum circuit within a quantum processor from one or more of the decision variables. In a particular embodiment, the quantum angles θ or other quantum state parameters for the quantum circuit are based upon the at least one discrete decision variable. In a particular embodiment, the classical computing system derives classical parameters ω from one or more of the determined decision variables. In a particular embodiment, the classical parameters ω are based upon the continuous decision variables. In one or more embodiments, the classical processor sends the quantum angles θ and/or other quantum state variables to a quantum processing system.

In block 606, quantum processing system 140 prepares one or more quantum states for a quantum processor based upon the quantum state parameters. In a particular embodiment, quantum processor 142 prepares the quantum state $|\psi(\theta)\rangle$ for the quantum circuit of quantum processor 142 based upon the quantum angles and/or other quantum parameters.

In block 608, quantum processor 142 of the quantum computing system executes the prepared quantum states as an initial quantum state of a qubit, and performs quantum measurements of intermediate states of the quantum processor to sample from a solution space of the combinatorial optimization problem. In particular embodiments, the samples include discrete values. In block 610, the classical computing system receives the samples from the quantum processor, evaluates the objective function using the quantum state measurement samples and classical parameters, and aggregates the values using a classical aggregation function to determine an aggregate quantum state measurement value from the samples and classical parameters. In a particular embodiment, the classical aggregation function averages the objective function values to determine a single aggregate objective function value. In another particular embodiment, the classical aggregation function utilizes a conditional value-at-risk (CVaR) algorithm to determine the aggregate objective function value. In one or more embodiments, the classical computing system evaluates the plurality of samples to obtain a measure of the quality of the quantum state and of the solutions to the mixed-integer optimization problem that can be sampled from such a quantum state. Process 600 then ends.

A particular example of solving a combinatorial optimization problem having mixed integer and continuous values applies one or more of the embodiments described herein to a Quadratic Assignment Problem (QAP). A QAP is directed to the problem of assigning facilities to locations so as to minimize a measure of transportation costs. In the example, binary decision variables $x_{ij}$ are used to indicate if a facility i is assigned to a location j. A traditional problem formulation for the QAP base equality constraints. In practice, it may be desired to include additional constraints such as specifying that a total amount of goods being transported to a given subset of the locations should not exceed a certain amount that is determined by the transportation capacity of the area. Such a constraint requires a linear inequality constraint. In the example, the inequality constraint is used to indicate, for example, that the flow entering or leaving a certain set of locations must not exceed a certain threshold. Accordingly, a decision variable associated with the flow may be parameterized as a classical parameter of an objective function and a discrete decision variable associated with locations may be parameterized using a quantum state parameter. In accordance with one or more embodiments, the classical parameters may be computed by a classical processor and the quantum parameters may be computed using a quantum processor.

Thus, a computer implemented method, system or apparatus, and computer program product are provided in the illustrative embodiments for solving mixed integer optimization problems on a hybrid classical-quantum computing system and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for solving mixed integer problems using a hybrid classical-quantum computing system comprising:
generating a plurality of decision variables for a function associated with a combinatorial optimization problem by a first processor using an optimizer, the plurality of decision variables includes at least one discrete decision variable and at least one continuous decision variable;
deriving at least one quantum state parameter for a quantum processor based upon one or more of the decision variables;
initiating the quantum processor in a quantum state based upon the at least one quantum state parameter;
measuring a plurality of intermediate quantum states of the quantum processor using a plurality of quantum measurements of the quantum state to obtain a plurality of samples; and
evaluating, by the first processor, the plurality of samples to obtain a measure of a quality of the quantum state and of one or more solutions to the combinatorial optimization problem.

2. The method of claim 1, wherein the first processor comprises a classical processor.

3. The method of claim 1, wherein the at least one quantum state parameter is derived based upon the at least one discrete decision variable.

4. The method of claim 1, further comprising:
deriving, by the first processor, at least one classical parameter from the at least one continuous decision variable.

5. The method of claim 4, wherein the evaluating further includes evaluating the at least one classical parameter by the first processor to obtain the one or more solutions.

6. The method of claim 5, further comprising:
evaluating the function for each of the plurality of samples and each of the at least one classical sample to obtain a plurality of function values; and
aggregating the plurality of function values using an aggregation function to obtain an aggregated function value result.

7. The method of claim 6, further comprising:
providing the aggregated function value result to the optimizer.

8. The method of claim 7, further comprising:
generating, by the optimizer, a plurality of updated decision variables for the function based upon the aggregated function value result.

9. The method of claim 1, wherein the at least one quantum state parameter includes a quantum angle.

10. A computer usable program product comprising one or more computer-readable storage devices, and program instructions stored on at least one of the one or more storage devices, the stored program instructions comprising:
program instructions to generate a plurality of decision variables for a function associated with a combinatorial optimization problem by a first processor using an optimizer, the plurality of decision variables includes at least one discrete decision variable and at least one continuous decision variable;
program instructions to derive at least one quantum state parameter for a quantum processor based upon one or more of the decision variables;
program instruction to initiate the quantum processor in a quantum state based upon the at least one quantum state parameter;
program instructions to measure a plurality of intermediate quantum states of the quantum processor using a plurality of quantum measurements of the quantum state to obtain a plurality of samples; and
program instructions to evaluate, by the first processor, the plurality of samples to obtain a measure of a quality of the quantum state and of one or more solutions to the combinatorial optimization problem.

11. The computer usable program product of claim 10, wherein the first processor comprises a classical processor.

12. The computer usable program product of claim 10, wherein the at least one quantum state parameter is derived based upon the at least one discrete decision variable.

13. The computer usable program product of claim 10, further comprising:
program instructions to derive, by the first processor, at least one classical parameter from the at least one continuous decision variable.

14. The computer usable program product of claim 13, wherein the evaluating further includes evaluating the at least one classical parameter by the first processor to obtain the one or more solutions.

15. The computer usable program product of claim 14, further comprising:
program instructions to evaluate the function for each of the plurality of samples and each of the at least one classical sample to obtain a plurality of function values; and
program instructions to aggregate the plurality of function values using an aggregation function to obtain an aggregated function value result.

16. The computer usable program product of claim 10, wherein the computer usable code is stored in a computer readable storage device in a data processing system, and wherein the computer usable code is transferred over a network from a remote data processing system.

17. The computer usable program product of claim 10, wherein the computer usable code is stored in a computer readable storage device in a server data processing system, and wherein the computer usable code is downloaded over a network to a remote data processing system for use in a computer readable storage device associated with the remote data processing system.

18. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to generate a plurality of decision variables for a function associated with a combinatorial optimization problem by a first processor using an optimizer, the plurality of decision variables includes at least one discrete decision variable and at least one continuous decision variable;
program instructions to derive at least one quantum state parameter for a quantum processor based upon one or more of the decision variables;

program instructions to initiate the quantum processor in a quantum state based upon the at least one quantum state parameter;

program instructions to measure a plurality of intermediate quantum states of the quantum processor using a plurality of quantum measurements of the quantum state to obtain a plurality of samples; and program instructions to evaluate, by the first processor, the plurality of samples to obtain a measure of a quality of the quantum state and of one or more solutions to the combinatorial optimization problem.

19. The computer system of claim 18, wherein the first processor comprises a classical processor.

20. The computer system of claim 18, the at least one quantum state parameter is derived based upon the at least one discrete decision variable.

* * * * *